Jan. 8, 1946.   P. SCHULTZE   2,392,777
APPARATUS FOR CONSTRUCTING PICKER ROLLS
Filed April 29, 1942   7 Sheets-Sheet 3
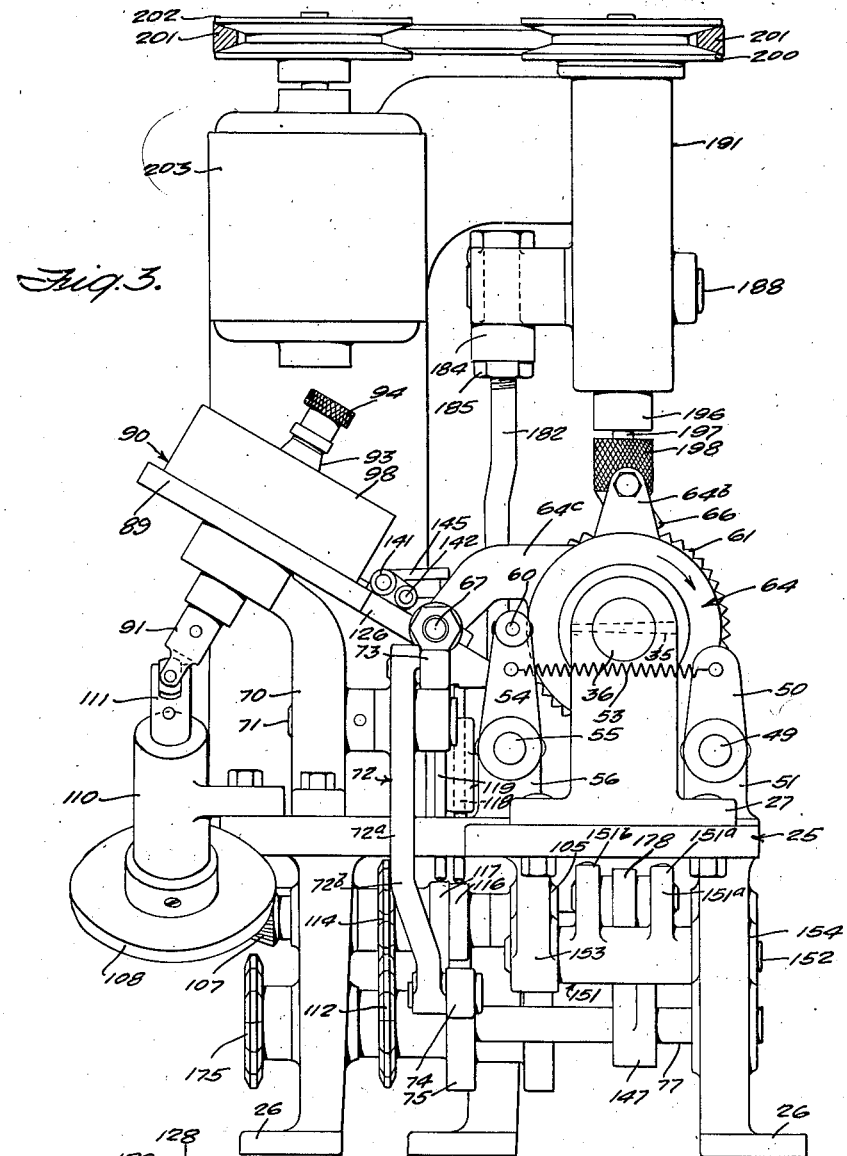
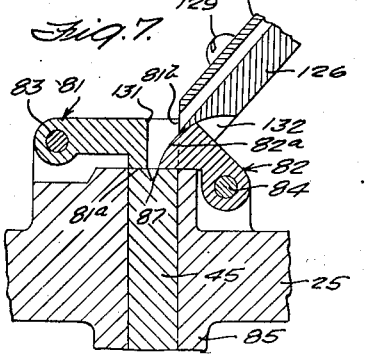
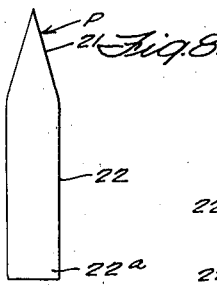
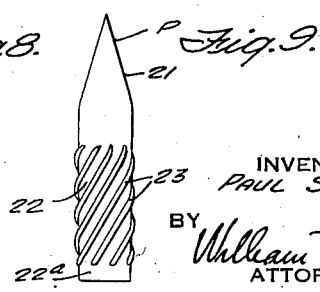
INVENTOR
PAUL SCHULTZE
BY
William T. Kuesner
ATTORNEY Jan. 8, 1946. P. SCHULTZE 2,392,777
APPARATUS FOR CONSTRUCTING PICKER ROLLS
Filed April 29, 1942 7 Sheets-Sheet 4
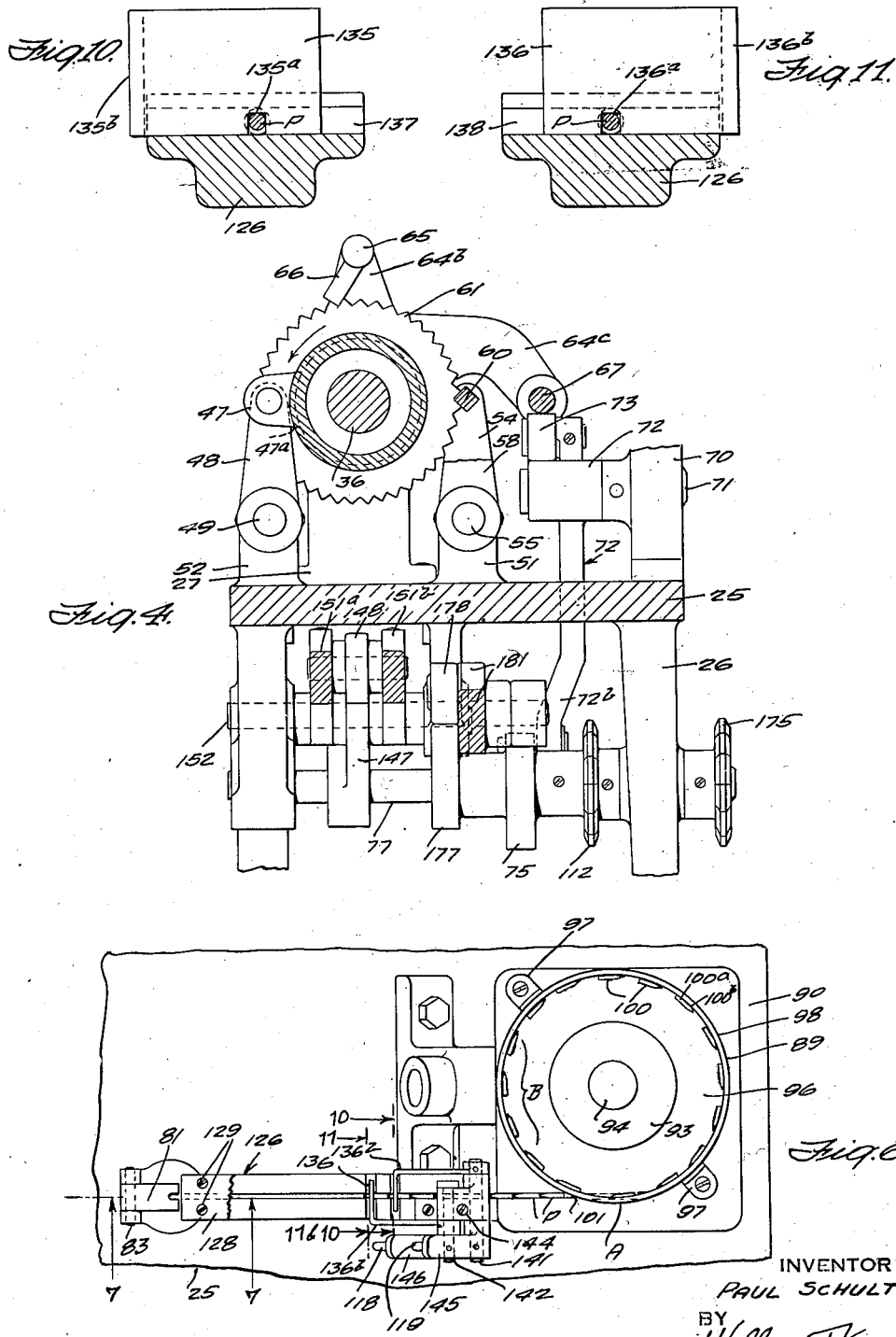
INVENTOR
PAUL SCHULTZE
BY William T Kuesner
ATTORNEY Jan. 8, 1946.                P. SCHULTZE                2,392,777
              APPARATUS FOR CONSTRUCTING PICKER ROLLS
                  Filed April 29, 1942        7 Sheets-Sheet 5

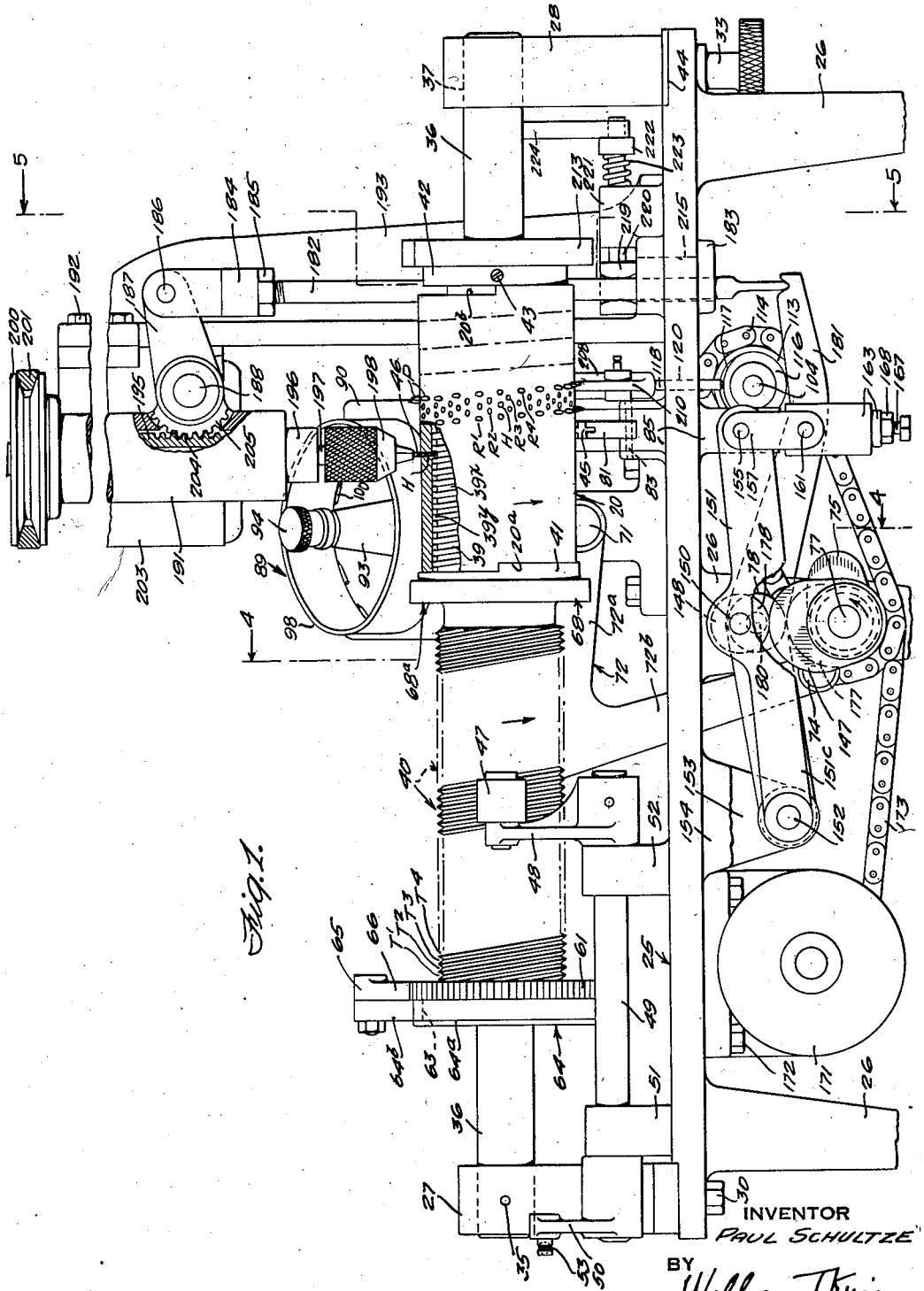

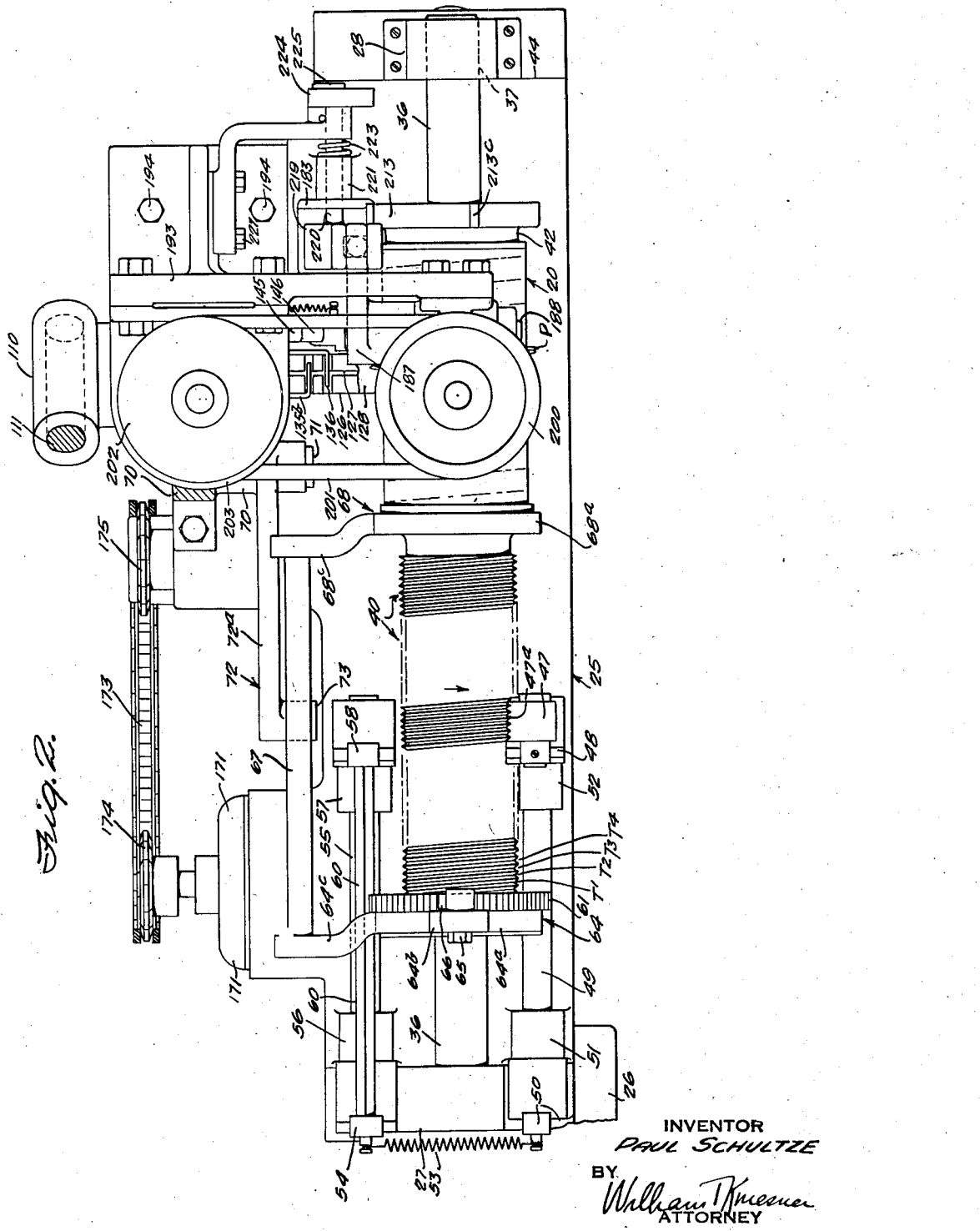

Fig. 5.

INVENTOR
PAUL SCHULTZE
BY
William T Kuesner
ATTORNEY

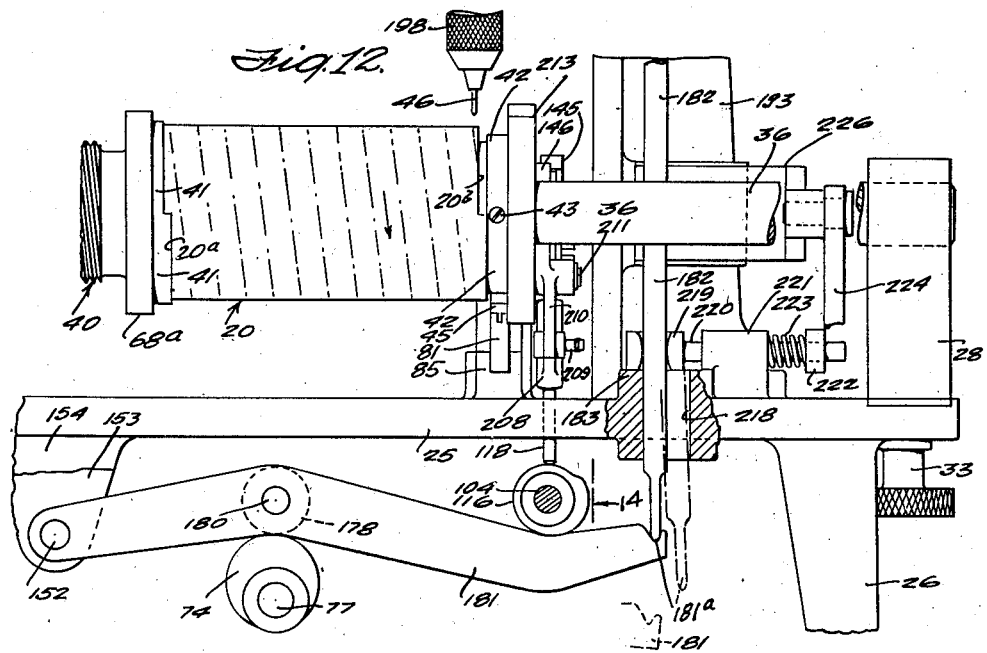
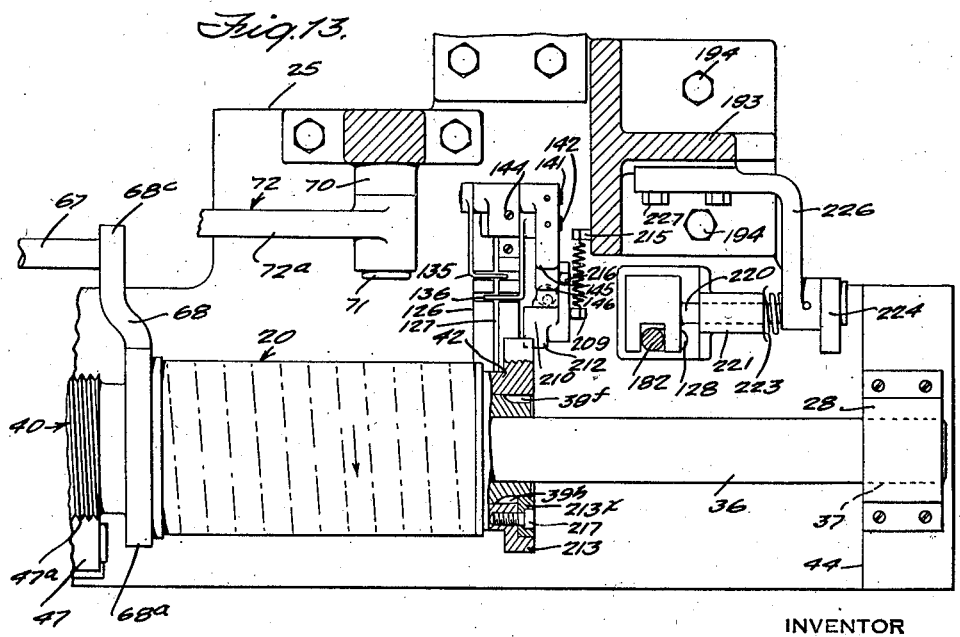

Jan. 8, 1946. P. SCHULTZE 2,392,777
APPARATUS FOR CONSTRUCTING PICKER ROLLS
Filed April 29, 1942 7 Sheets-Sheet 7

INVENTOR
PAUL SCHULTZE
BY
William T. Kiesner
ATTORNEY

Patented Jan. 8, 1946

2,392,777

UNITED STATES PATENT OFFICE 2,392,777

APPARATUS FOR CONSTRUCTING PICKER ROLLS

Paul Schultze, Danbury, Conn., assignor to Doran Brothers, Incorporated, Danbury, Conn., a corporation of Connecticut Application April 29, 1942, Serial No. 441,045

25 Claims. (Cl. 1—1)

This invention relates to an apparatus for the preparation of certain parts of high speed picker roll elements and for the assembly thereto of other parts, thus to complete the picker roll elements, the latter being particularly for use as picker rolls or picker cylinders employed in apparatus for blowing or separating fur for fur felt manufacture.

One of the objects of this invention is to provide a dependable and practical apparatus for rapidly and efficiently preparing the hollow cylindrical support for the reception of the picker pins and for assembling the latter to the support, in a manner to make it possible to provide and maintain dynamic balance. Another object is to provide an efficient apparatus, capable of operating at high speed, for drilling appropriately distributed holes in the picker roll support for the reception of the picker pins.

Another object is to provide an efficient and dependable apparatus that will be capable, at relatively high speed, of drilling suitably distributed holes through the relatively thin wall of a hollow cylindrical support and at the same time of anchoring picker pins in such holes with such substantial identity of distance of the centers of mass of the pins as will achieve dynamic balance.

Another object is to provide an apparatus of the above-mentioned character that will be of improved and compact construction, of efficient action, and well adapted to meet the varying conditions of hard practical use. Another object is in general to provide improved apparatus capable of highly efficient functioning in the art to which it pertains. Other objects will be in part obvious or in part pointed out hereinafter.

Another object is to provide an apparatus for drilling holes in the desired pattern, such as in a row or rows, and to follow up the drilling of the holes by putting pins therein, and to make in such an apparatus suitable provision for compensating for the time differentials at which the drilling and pin-setting operations are performed. Another object is to provide, in such an apparatus, a dependable control to insure that the operation of assembling the pins to the holes takes place properly after a suitable number of holes have been formed to correspond to the space differential between the locus of operation of the pin-assembling mechanism and the locus of operation of the drill. Another object is to provide, in such an apparatus, a dependable control for halting the hole-forming operation at the completion of the pattern and to continue the pin-assembling operation until the holes corresponding to the space differential above mentioned have had pins assembled thereto.

Another object is to provide an apparatus of the just-mentioned character that will be thoroughly practical and dependable and which will be capable of operation with minimum supervision. Another object is to provide an apparatus of the just-mentioned character in which the controls are readily adaptable to varying requirements met with in practical use.

The invention accordingly consists in the features of construction, combinations of elements, and arrangements of parts as will be exemplified in the structure to be hereinafter described and the scope of the application of which will be indicated in the following claims.

In the accompanying drawings, in which is shown one of various possible embodiments of my invention:

Figure 1 is a front elevation of the complete apparatus;

Figure 2 is a plan view thereof with certain parts omitted or broken away to show certain other parts more clearly;

Figure 3 is an end elevation as seen from the left in Figure 1;

Figure 4 is a sectional view as seen along the line 4—4 of Figure 1, certain parts being broken away or omitted;

Figure 5 is a view as seen along the line 5—5 of Figure 1;

Figure 6 is a view of part of the apparatus as seen along the line 6—6 of Figure 5;

Figure 7 is a detached vertical sectional view as seen along the line 7—7 of Figure 6;

Figure 8 is an elevation on a larger scale showing an illustrative form of pin;

Figure 9 is an elevation on a larger scale showing another illustrative form of pin;

Figure 10 is an elevation, partly in section, as seen along the line 10—10 of Figure 6;

Figure 11 is an elevation, partly in section, as seen along the line 11—11 of Figure 6;

Figure 12 is a front elevation, like that of Figure 1, certain parts however being broken away or omitted, showing certain relationships upon setting the apparatus to drill the first hole;

Figure 13 is a plan view of the apparatus shown in Figure 12;

Similar reference characters refer to similar parts throughout the several views of the drawings.

Figure 15:
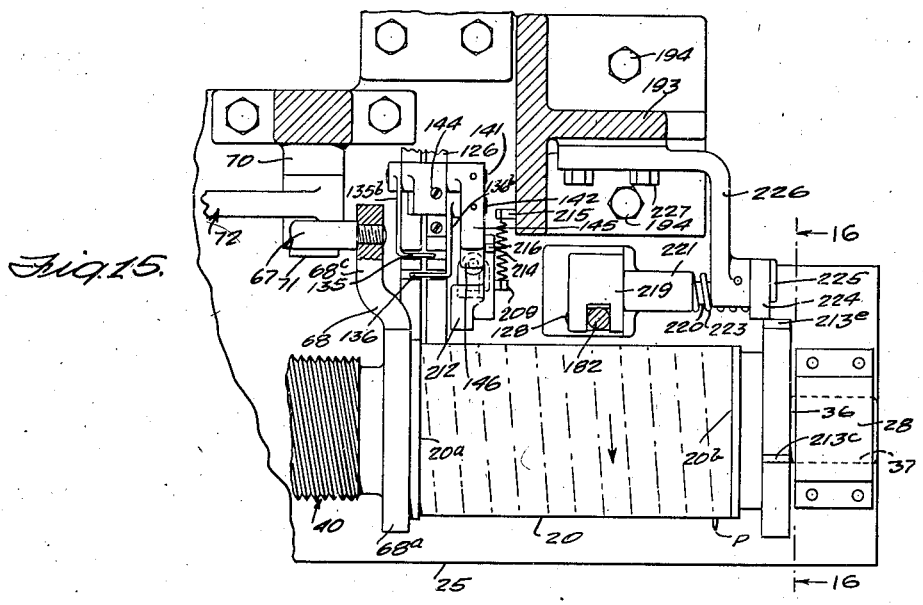
Figure 15 is a view like that of Figure 13 but shows the relationship of certain of the parts upon driving of the last pin.

As conducive to a clearer understanding of certain features of this invention, it might here be noted that, in the fur felt industry, "blowing" machines are employed to effect separation from the desired fur fibres of heavier fur fibres and foreign or undesirable material, like pieces of skin, and that in such machines there are employed picker rolls that have to be driven at high rotary speeds, speeds on the order of 4,000 R. P. M., the separating action above mentioned taking place, in coaction with other elements, as a result of the high velocity imparted to the particles by the rapidly revolving picker rolls. In such actions, the heavier or undesired particles or materials are caused to exert centrifugal forces sufficient to discharge them tangentially away from the lighter or desired fur fibres, the latter being moved in the desired direction by air currents produced by the projecting picker pins of the high speed picker roll.

To achieve these actions requires high peripheral velocities and I have found that where the picker roll diameter is on the order of 4", a drive on the order of 4,000 R. P. M. is appropriate where the picker pins are closely set and project from the picker roll for about 1/4". The pins are preferably of metal, such as steel, and where projecting ends are pointed the shanks may be plain or may have a multiple thread of large pitch thereon so as to cut their own thread when forced into the support.

At these high peripheral velocities and with the relatively substantial size or mass of the pins, there should be good dynamic balance of the picker roll and such a secure anchorage of the pins therein as to resist the centrifugal force tending to dislodge them, for loss of pins would not only diminish the action and efficiency of the picker roll but also effect unbalance. Moreover, the pins are very numerous. To provide a practical, efficient and high speed apparatus for uniformly distributing and assembling and anchoring such picker pins to a rotary picker roll element is one of the dominant aims of this invention.

A preferred and illustrative form of rotary base or picker roll element for supporting and anchoring the pins comprises a tubular or sleeve-like element indicated generally by the reference character 20 in Figures 1, 2 and 5 of the drawings, being relatively thin-walled, made of a material of good tensile strength, and preferably of a mouldable material such as phenolic condensation product, preferably with fibrous material such as layers of suitable fabrics embedded therein and impregnated by and bound together with the phenolic condensation product. The sleeve element, referred to in the claims also as a "support," may have an inside diameter of 2¾", an outside diameter of $3\frac{1}{16}$", making a wall thickness of $\frac{3}{32}$". Such a sleeve element, either singly or several of them axially aligned, may be mounted upon a drum-like shaft of metal onto which it snugly fits and is sleeved and suitably secured thereto, and as so mounted may function in the above-mentioned fur blowing machines.

The pins "P" preferably take a form like those shown in Figures 8 and 9, being preferably of metal, such as steel, and being dimensioned to have good points as at 21 and good rigidity to resist the reactions of the mechanical forces exerted in the blowing machine; thus, they may be of a thickness on the order of $\frac{1}{16}$".

They have shanks 22 preferably cylindrical in form and in the form of Figure 9 the shank is provided with threads 23 of relatively large pitch and preferably terminating short of the stub end of the pin, thus to leave a portion 22ᵃ of the shank substantially free of threads and of a diameter on the order of the root diameter of the threads 23.

By means later described, the sleeve 20 is drilled to provide it with holes H preferably arranged in one or more helical rows, illustratively four helical rows, one of which is indicated in Figure 1, at $R^1$, analogous to a multiple thread of substantial pitch, the holes, as is also indicated in Figure 5, extending completely through the wall of the sleeve 20. They should be uniformly distributed and moreover the diameter of the holes H is somewhat less than the diameter of the shank 22 of the pins P where the latter are plain, as in Figure 8, so that the fit of the shank into a hole is analogous to a force fit, and where pins of steel pitch threads are employed as in Figure 9, the diameter of the holes is just about equal to the root diameter of the threads 23 so that the threads have to cut themselves a corresponding threaded pathway into the material of the sleeve 20, the pin undergoing rotary movement in the process. The tough character of the material of sleeve 20 thus causes it, in either case, to securely grip and envelop the shank of the pin when the latter is forced home, the shank becoming in effect tightly embedded and securely anchored in the material. The great number of pins are to be assembled to the sleeve with a security or anchorage like that above mentioned and moreover with their centers of mass equidistant from the axis of the sleeve.

The apparatus for effecting such drilling and assembly comprises (see Fig. 1) a base 25 with supports or legs 26, and upstanding from the base 25 are standards 27 and 28 of which standard 27 is rigidly and fixedly secured as by the screws 30 and standard 28 is detachably secured to the base as by a threaded stud 31 projecting downwardly from the standard 28 through an open-ended slot 32 in the base 25, threaded stud 31 receiving a hand-operated clamping nut 33. In standard 27 is rigidly anchored, as by a pin 35, a relatively heavy and strong shaft 36 whose opposite end enters a hole 37 in the standard 28, thus to support the right-hand end of the shaft 36.

Shaft 36 rotatably and slidably supports a cylindrical structure of which the right-hand portion is in the form of a mandrel 39 of a length appropriate to receive thereon the sleeve 20 and of which the left-hand portion is threaded as at 40, the portion 40 having thereon threads which in number and pitch correspond to the number and pitch of the rows of the holes H in the sleeve 20. Thus, where the latter is to have four rows or helixes, portion 40 has four threads, $T^1$, $T^2$, $T^3$ and $T^4$.

Suitable means are provided for fixing the position of the sleeve 20 relative to the threads of element 40. Since, in the preferred construction of the above-mentioned picker rolls, I prefer to sleeve several sleeves 20 onto the driving and supporting drum or shaft and since for that purpose I provide the peripheral ends of the sleeves with cut-outs 20ª and 20ᵇ, preferably each of 180° extent and displaced from each other by 180° so that successive sleeves interfit and interlock at their adjacent ends, I prefer to utilize such stepped or cut-out ends of the sleeve for fixing its position relative to the threaded part 40 and hence, intermediate of the parts 39 and 40 I may provide an annular shoulder 41 presenting at its right-hand end, as viewed in Figure 1 a step or cut-out of 180° extent with which the left-hand end of sleeve 20 interfits and thus holds the sleeve 20 against rotation relative to the mandrel 39, as is clear from Figures 1 and 2, and onto the end of mandrel 39 I may slip a collar 42 temporarily anchored as by a set screw 43 to hold the sleeve 20 against axial movement out of interlocking relation with the shoulder 41.

By loosening up the hand nut 33, the standard 28 may be slipped off toward the right, leaving the shaft 36 supported as a cantilever from the standard 27, whence, after loosening the collar 42, the collar and the sleeve 20 may be slipped off the mandrel 39 and right-hand end of shaft 36, to be replaced by another, by a reverse sequence of steps, it being noted that the base 25 is suitably shaped as at 44 to form a seat for the standard 28 and thereby fix the position to which it is returned.

The mandrel 39 is preferably constructed to give the relatively thin-walled sleeve 20 substantially uniformly distributed support and for that purpose I prefer to have the outside diameter of the mandrel 39 dimensioned to snugly receive thereover the sleeve 20, but externally the mandrel 39 is grooved as at 39ˣ to provide as many helical grooves 39ˣ, as there are to be helical rows of pins, illustratively four such helical grooves corresponding also in pitch to that of the four helical rows R¹, R², R³ and R⁴ of the above-mentioned holes H; this construction leaves the cylindrical surface sub-divided into a similar number of helixes 39ʸ which thus present uniformly distributed supports against which the internal face of the sleeve 20 engages. The structure 39—40 may be made hollow or tubular, if desired, excepting of course at those portions, such as the ends, where it is bored to a diameter to form a sliding and rotary fit relative to the fixed shaft 36.

The shaft 36 is of sufficient extent relative to the length of the structure 39—40 to give a range of sliding movement sufficient to traverse the entire length of the sleeve 20 relative to two points which, in order not to require extension of the range of such sliding movement, are preferably displaced in an axial direction as little as possible; one of these points is at the locus of operation of a drill 46 (Figure 1) and the other is at the locus of operation of the vertically movable pin-forcing device which includes a plunger 45. Conveniently, drill 46 and plunger 45 are diametrically opposed (Figure 5), being thus spaced 180° from each other, and to achieve the above-mentioned preferred or minimum spacing, they are axially displaced (see Figure 1) by a distance corresponding to half a turn of the equally pitched helical grooves 39ˣ. Both drill 46 and plunger 45, having their vertical axes intersecting the axis of the mandrel 39 where the pins are to be positioned radially of the sleeve 20 are thus juxtaposed to a helical groove 39ˣ in the mandrel 39, drill 46 being in advance of the plunger 45 with respect to the direction of rotary movement of the mandrel and sleeve, that direction being as indicated by the arrow in Figure 1.

Where the displacement between the drill and pin-forcing device is 180°, I prefer to position the drill 46 with its driving support or chuck above the mandrel 39 and the pin-forcing plunger 45 below the mandrel. In the relationship shown in the drawings, sleeve 20 with its helically grooved supporting mandrel 39 is at a point substantially halfway of its sliding traverse along the shaft 36.

Coacting with the threaded element 40 is a block 47 having a face 47ª (Figure 2) that is curved and threaded to mate with the threaded surface of the part 40, being like a segment of a nut. Block 47 is held against movement lengthwise of the guiding shaft 36 but is mounted to be moved toward or away from threaded element 40 so as to engage or disengage its thread. Conveniently, it is supported on an arm 48 fixed to a shaft 49 that has an arm 50 fixed to its other end, shaft 49 being supported in two upstanding bosses 51 and 52 in which it and the arms may oscillate as a unit and by which this unit is held against axial movement.

Suitable means are provided to hold the block 47 in engagement with the threaded part 40 and such means preferably comprises a spring 53 connected to arm 50 and to an arm 54 (Figures 2 and 3) secured to a shaft 55 supported in bosses 56 and 57 projecting upwardly from the base 25 like the bosses 51—52 that support shaft 49.

Shaft 55 can swing in the bosses 56—57 but is held against axial movement by the engagement of arm 54 with the boss 56 and by the engagement of an arm 58 at its other end with the boss 57. Arms 54 and 58 extend upwardly and in parallelism (Figures 2, 3 and 4) and in their upper ends fixedly support the ends of a holding pawl 60 which, being conveniently in the form of a square rod, presents throughout its length, which is at least equal to the traverse stroke of the structure 39—40, a single tooth-like portion for coaction with a toothed ratchet wheel 61 mounted or formed at the left-hand end of the rotary and slidable structure 39—40. Thus holding pawl 60 may coact with the ratchet wheel 61 at any point in the axial movement of the wheel 61 whose teeth are in number the same as the number of holes H desired to be provided in a single turn of the sleeve 20 or of a helical row of holes.

Spring 53 will thus be seen to bias the threaded block 47 into engagement with the threads of part 40 and to bias also the holding pawl 60 into proper coaction with the ratchet wheel 61, and normally holds each of them in its proper coacting relation. But pawl 60 may be disengaged from ratchet wheel 61 manually simply by swinging it away from the ratchet wheel and against the tension of spring 53 and in a similar way block 47 may be manually disengaged from the threaded part 40.

To the left of ratchet wheel 61, as seen in Figures 1 and 2, the structure 39—40 is constructed as at 63, to provide a bearing for the hub 64ª of a bell crank lever 64 having an upwardly directed arm 64ᵇ by which is pivotally carried, as by the pin 65 a pawl 66 urged in any suitable way, as by its own weight, into coacting relation to the ratchet wheel 61 (see Figures 3 and 4).

The other arm 64ᶜ of the bell crank lever 64 extends rearwardly and downwardly and has secured to it one end of a rod 67 whose other end is rigidly secured to the arm 68ᶜ of a lever 68 whose hub 68ᵃ has a bearing co-axial with the bearing of hub 64ᵃ of lever 64, and this bearing is conveniently and preferably formed in the left-hand portion of the shoulder 41 (Figures 1 and 2) of the structure 39—40.

A bracket 70 secured adjacent the rear end of the base 25 carries a horizontal pin 71 (Figures 2, 3 and 4) which forms a horizontal pivot for one arm 72ᵃ of a V-shaped lever 72 (see Figure 1) at whose apex is mounted a roller 73 which is thereby positioned underneath the rod 67, and whose other arm 72ᵇ extends downwardly through a suitable aperture in the base 25 and has mounted on its end a roller or cam follower 74 for coaction with a cam 75.

Cam 75 is mounted upon a shaft 77 extending transversely of and below the base 25 from which extend downwardly suitable means such as an arm 78 and one of the legs 26 suitably bored or provided with bearings for the shaft 77.

By means of the rotating cam 75, the lever 72 is actuated in clockwise direction about its pivot pin 71 (as viewed in Figure 1) and given a return stroke, once for each revolution of the cam 75 and at a suitable point in its rotation, cam follower 74 being held in coaction with the cam 75 in any suitable way as, for example, by the weight of the lever 72 and the weight of the rod 67 and the lever arms 64ᶜ and 68ᶜ which tend to swing downwardly or in counter-clockwise direction, as viewed in Figure 3.

Accordingly, upon the upward swing or stroke of lever 72 (Figure 4) roller 73 moves upwardly and, being in engagement with the rod 67 irrespective of the position of the structure 39—40 lengthwise of the guide shaft 36, moves the latter upwardly and thus moves the pawl 66 in counter-clockwise direction to rotate the ratchet wheel 61 and hence the structure 39—40 by an amount equal to the distance between two teeth of the ratchet wheel 61, the angle of movement corresponding to the angle desired to be subtended by two successive pins in the ultimate picker roll and hence by two successive holes H to be drilled in a row of holes in the sleeve 20, the holding pawl 60 yielding toward the right as this rotary movement commences and being in effect cammed out of the space between two teeth but being entered into the next succeeding space under the bias of spring 53, thus not only to hold the structure 39—40 in its new position, but also, by bottoming in the succeeding space, accurately fixing the step of rotary movement to the above-mentioned angle.

And as that rotary movement takes place, the coaction between the threaded part 40 and the block 47 (Figure 1) effects a movement of translation of the structure 39—40 along its guiding support 36, and with the actuating pawl moving in the direction above described and with the threads on part 40 being as shown in Figure 1, that step of rotary movement is accompanied by a step of traverse of the structure 39—40 in a direction toward the right as viewed in Figure 1.

Since the drawings show the sleeve 20 and the mandrel 39 at about its halfway point of rotary and axial traverse, thus assuming that certain operations, namely, the drilling and pin-setting, as hereinafter described, have taken place throughout about one-half of one of the helixes, the completion of the above-mentioned step of conjoint rotary and axial movement of the structure 39—40 brings a blank space or portion of the sleeve 20 into juxtaposition to the locus of operation of the drill 46 and brings an already drilled hole into alignment with the plunger 45 to have a pin pressed or forced into the hole, there being a 180° arcuate extent of drilled holes between the point of operation of the plunger 45 and the point of operation of the drill 46 because these two elements happen to be spaced 180° apart as above noted.

With the halting of the sleeve 20 in this new position, the drill 46 having been held in withdrawn position during the movement as is later described, is now moved downward as seen in Figures 1 and 5 at a suitable cutting feed rate to drill a hole in the blank space of the sleeve 20, and as shown in Figure 1 the downward movement of the drill is preferably to an extent to pierce the relatively thin wall of the sleeve 20, the protruding end of the drill being accommodated in the underlying helical groove 39ˣ, and which is of ample width and depth for that purpose. During the drilling operation, the wall of the sleeve 20 is well supported against the pressure of the drill, by the helical mandrel faces 39ʸ to either side of the helical groove 39ˣ as seen in Figure 1, the downward pressure upon the mandrel 39 being opposed by the upward pressure thereon exerted by the plunger 45 which, during the drilling stroke of the drill is moving upwardly as viewed in Figure 1 to force-fit a pin into a hole in the sleeve 20. The coacting mechanisms for achieving properly timed work and retrograde strokes of the drill 46 and the plunger 45 are described later in detail, since their construction and coactions are better understood after certain other mechanisms and their functions are described, and since it will further be appreciated that high speed and dependability of operation are not achieved if, for example, the succession of holes is drilled without assurance of properly setting a pin in each hole.

Plunger 45, at the conclusion of the above-described rotary and axial movements of mandrel 39—40, is in lowermost position, a position better shown in Figure 7 and it is brought into that position, by mechanism about to be described, in order to achieve the actuation of separable throat elements which in Figures 5 and 7 are shown as comprising two members 81 and 82, pivotally mounted on pins 83 and 84 carried in spaced ears formed in the upper portion of a boss 85 preferably formed integrally with the base 25 and bored or drilled as at 86 to form an accurate guide for the cylindrical plunger 45 to guide its axis preferably in a line at right angles to, and intersecting, the axis of the mandrel 39 and hence of the sleeve 20.

The separable throat elements 81—82 are biased toward each other and toward the line of vertical movement of the plunger 45, in any suitable way, and conveniently this may be achieved by so shaping and pivoting them that their respective weights effect the desired bias, though it will be understood that springs may be employed if desired.

With plunger 45 in its lowermost position as in Figure 7 and being provided, in line with its axis, with a tapered hole or recess 87 that is conformed generally to the shape of the pointed or tapered ends 21 of the pins P (Figures 8 and 9), a pin P is supplied to the plunger 45 and injected into the recess 87 pointed end first, from a supply magazine generally indicated by the reference character 89 and by coacting mechanism to insure that no pin is supplied to the plunger reversed end for end and to insure reliable assembly of the pin to the plunger, during the short interval of time available.

Magazine 89 comprises a base plate 90 supported at an incline by an upward and rearward extension of the bracket 70 and extending centrally through the plate member 90 and having a suitable bearing in the outer end of bracket 70 is a shaft 91 at whose upper end is secured a somewhat conically shaped hub 93, being preferably detachably secured in any suitable way as by the thumb nut 94; at the lower end of hub 93 is secured a circular plate 96 of a thickness on the order of the diameter of the pins P, and extending about the periphery of the rotary disk 96 is a cylindrical wall 98, parts 96 and 98 together forming a container into which a suitable quantity of pins P are placed. Brackets 97 secure part 98 to the base 90.

At the outer periphery of the bottom or plate element 96, which rests snugly and flatwise against the upper face of the frame plate 90 and relative to which it rotates, and within the circular or cylindrical boundary formed by the inner face of the wall element 98, I provide in the member 96 a series of apertures or recesses 100 which have substantially the same shape as the pins P as the latter are viewed in Figures 8 and 9 or as they are shaped in central longitudinal cross-section and hence each recess or slot 100 has a portion 100$^a$ corresponding to the shank part 22 of the pins and a tapered forward portion 100$^b$ corresponding to the tapered or pointed portions 21 of the pins, and as shown in Figure 6, the apertures or slots 100, preferably substantially equidistantly spaced are arranged in succession but with the tapered portions 100$^b$ of all of them heading in the same direction.

As the disk plate 96 is rotated in clockwise direction in Figure 6, its underface moves relative to the frame plate 90 and its upper face, upon which the haphazardly arranged mass of pins rests, tends to drag the pins along with it, but due to the tilt of the structure as better appears in Figure 5, the mass of pins tends to gravitate and remain somewhat concentrated within the lower left hand portion of the container 96—98.

This gravitation, aided by the rotary movement of the bottom plate 96, insures the lining up of the pins tangentially and in the general region of the apex of the angle between the wall 98 and the bottom plate 96 where they are of lowest elevation, and individual pins tend to hug into that apex. Such of them as do so with their pointed ends heading clockwise (Figure 6) fall into the slots 100, one by one, as the slots are successively brought through the region of lower elevation of the magazine, resting against the frame plate 90 relative to which they are carried or moved clockwise.

Such of the pins as are not thus trapped in a slot 100, for example, pins that have their shank ends headed in clockwise direction, cannot register with and enter a slot, but in the process of being agitated and moved around by the slow rotation of the plate 96 eventually become turned end for end, gravitate into the above-mentioned apex, and enter or are trapped by the slots 100, and thus start upon their controlled movement of translation about the axis of the magazine.

In the frame plate 90 is formed a straight channel 101 of a depth and width adequate to accommodate pins P, as shown in Figures 5 and 6, and channel 101 extends in a direction so that it partakes of the incline of the frame plate 90 and so that it underlies the rotary bottom plate 96 and is tangent to the circle along which the midpoints of the slots 100 are aligned. This relationship of tangency is generally indicated in Figure 6 at A.

Accordingly, pins P which become seated in the slots 100 as the latter traverse the region substantially like that indicated at B, are transported in clockwise direction from the region B and as the slots 100 are successively brought to the region A of tangency and hence successively brought into a position overlying and aligned with the channel 101, the pins, no longer finding support upon the upper face of the frame plate 90, drop into the channel 101 and due to its inclination slide downwardly toward the left as viewed in Figure 5, along the channel. Should the channel 101 be filled throughout its length by pins P, the pins in the channel 101 prevent the pin in a slot 100 from dropping into the channel 101 and any such pin remains in the slot 100 and has to make a 360° circuit of movement before it is again presented at the region of tangency to the channel 101.

The number of slots 100 and the rate of drive of the slotted plate 96 are such that, even allowing for failure of pins to enter some of the slots during a single rotation, pins are presented at the region A of tangency at a rate greater than the rate at which the plunger 45 can assemble the pins to the sleeve 20 as the latter is given step by step rotary and traverse movements, thus to insure against gaps in any helical row of pins on the sleeve 20.

The shaft 91 (Figure 5) of the magazine structure is preferably driven from an auxiliary shaft 104 rotatably supported preferably underneath the frame 25 in suitable spaced bearing bosses 105 and 106; driving connection from shaft 104 to the magazine shaft 91 may be effected by reduction gearing such as the small bevel gear 107 on shaft 104 driving the large bevel gear 108 on a shaft 109 extending upwardly and at an incline through a bearing support 110 secured to the base 25, whence shaft 109 and magazine shaft 91 are connected by any suitable form of flexible or universal joint indicated at 111.

Shaft 104 (Figure 5) is preferably driven in synchronism or timed relation with the main drive shaft 77 above mentioned, and a convenient driving connection between the two, for this purpose, may comprise sprockets 112 and 113 and a chain 114. This timed relationship I effect because I prefer to actuate from shaft 104 certain mechanisms which coact with the above-mentioned separable throat elements 81—82 and with the above-described magazine construction, particularly with the action that takes place at the region A of tangency, and conveniently I actuate such mechanisms from cams 116 and 117 (Figures 3 and 5) mounted upon shaft 104.

In Figure 1, cam 116 is seen in side elevation to indicate the general character of its shape and cam 117 is of the same shape but is displaced from cam 116 by a suitable number of degrees as later pointed out. Coacting with these two cams are cam followers 118 and 119, conveniently in the form of vertically extending rods, biased into cam-following relation by any suitable means, conveniently by their own weight, and provided with any suitable means, such as apertures 120 and 121 in the base 25 and apertures 122 and 123 in a block 124 adjacent their upper ends, for slidably supporting and guiding them.

Block 124 is secured to or supported from an elongated downwardly inclined member 126 rigidly secured at its upper end to the magazine frame plate 90 and having formed in its upper face a channel 127 which is aligned with the channel 101 in the frame plate 90 and forms in effect a continuation thereof, and preferably throughout the lower extent thereof as seen in Figure 5, the channel extension 127 is covered over as by the strip-like member 128 removably secured in place as by screws 129. Throughout its lower portion it may be given a suitable degree of curvature to bring the lower end or terminus of the channel extension 127 at a greater inclination and in better alignment with the separable throat elements 81—82 which, in turn, form substantially an extension of the channel extension 127 (see Figure 7).

The pivoted throat element 81 (Figures 6 and 7) has at its right-hand end a bottom face 81$^a$ that registers with the upper face of plunger 87 when the latter is in the position shown in Figure 7 and at its right-hand end it terminates in a slightly curved and almost vertical face 81$^b$ and is slotted as at 131, the slot having parallel side walls spaced apart by a distance equal to the width of the channel extension 127 with which the open end, in the vertical face 81$^b$, of the slot 131 is in alignment, while the left-hand wall of the slot 131 extends vertically (Figure 7), being shaped so that a pin, entering the recess 87 in the plunger 45 pointed end first, just about contacts the U-shaped (see Figure 7) walls of the slot 131 as the pin snugly seats itself in the tapered recess 87 and assumes a true, upright position.

The throat element 82 is of a thickness to pass freely into the slot 131 through the right-hand open end thereof in throat element 81, and it has a pin-engaging or guiding face 82$^a$ whose right-hand end is in alignment with the bottom face of the channel extension 127 (Figure 7) and whose left-hand end is substantially tangent to the tapered recess 87 in plunger 45, it being noted that this edge face 82$^a$ may conveniently be curved and may have the axis of pivoting of throat element 82 as its axis of curvature. Along the lower underside of the channel member 126 and in line with the channel 127 therein, there is formed or milled a slot 132 preferably intersecting the bottom of the channel extension 127, so that the edge face 82$^a$ may align itself neatly as an extension of the bottom of the channel 127 and also so that throat element 82 may be swung in clockwise direction out of the path of upward movement of plunger 45, as shown in Figure 5.

Accordingly, with the parts in the position shown in Figure 7, a pin, controlled as above and later described, may slide down the channel extension 127 at considerable velocity, the time elements being short and the inclination of the channel carrying element 126 being appropriately steep. This occurs during the time that the drill 46 is withdrawn upwardly, as viewed in Figure 1, and as is later described, and also with the plunger 45 lowered from the position shown in Figure 5 to the position shown in Figure 7, throat elements 81 and 82 restoring themselves to throat-forming relation to both the plunger recess 87 and the channel extension 127.

Emerging from the terminus of channel extension 127, pointed end first, the speedily moving pin is now precluded from bouncing or from falling over or from improperly entering its pointed end into the plunger recess 87. The parallel side walls of the U-shaped slot 131, in throat element 81, (see Figure 7), prevent the pin from wobbling sideways (that is, in an up or down direction as viewed in Figure 6) and the left-hand wall of the slot 131 in coaction with the inclined or curved throat surface 82$^a$ effect a neat and positive guiding of the point of the pointed end into the wide upper end of the tapered recess 87, the curvature or inclination of the wall surface 82$^a$ bringing the pin progressively more and more into an upright position and hence into alignment with the vertical axis of the recess 87 and plunger 45. The left-hand wall of slot 131 limits the extent of this tilting of the pin (in counter-clockwise direction as viewed in Figure 7), and thus prevents any tendency of the pin to oscillate as it seats its pointed end in the tapered recess 87, and thus insures against delay in proper seating of the pin, only a very short interval of time being available.

While these actions are taking place, the magazine 89 continues to bring pins successively to the region A of tangency but the supply of another pin to the channel extension 127 must be prepared and held in readiness and at the same time jamming of pins at the region A of tangency, with resultant jamming of the channel 101 and of the rotary magazine, should be guarded against. Here I prefer to utilize the timed actuations of the cams 116 and 117 and arrange their cam followers 118 and 119 to control, in proper timed relation, two gates 135 and 136 (Figure 6) which are related to the channel 101—127 and to the region A of tangency.

Gates 135 and 136 extend transversely of the above-mentioned channel, being spaced lengthwise thereof by a distance equal substantially to the length of a pin, and the bottom edges of the gates bottom in slots 137 and 138 respectively that extend transversely of the channel carrying member 126 and that are of a depth equal to the depth of the channel extension 127. The gates have relatively narrow slots 135$^a$ and 136$^a$ (see Figures 10 and 11) formed in them from their lower edges, the slots being of a width less than the shank portions 22 (Figures 8 and 9) of the pins so that, when in stopping position, each gate may straddle a portion of the tapered end of a pin and thus hold it from moving along the channel, and as shown in Figure 6, with gate 136 holding a pin P as just stated, gate 135 may straddle and hold the next succeeding pin P against downward movement in the channel, even though its pointed end touches the flat or stub end of the pin stopped by the gate 136.

With the pins all of the same length, and lying in end to end contact in the channel 101 (Figure 6), the gate 135 is positioned at such a point or distance from the region A of tangency that, assuming the inclined channel 101 to be completely filled with the gate 135 in stopping position, the uppermost pin of the row of pins in channel 101 is just about at that point in the region A of tangency where it was when it dropped from a slot 100 into the channel 101, so that a succeeding pin brought by the bottom plate 96 to the region of tangency cannot fall or drop into the channel 101 and slides over the pin already at that point without becoming jammed. Hence element 96 with its slots 100 does not drop a pin into channel 101 unless and until gate 135, in coaction with gate 136 as later described, permits a downward advancing movement of the pins in channel 101 by the distance of the length of one pin, thus clearing a space in the channel 101 at the region A of tangency for a succeeding pin to drop into it.

Just about when plunger 45 and the throat elements 81—82 reach the relationship shown in Figure 7 and described above in detail, cam 116 lifts the gate 136 upwardly away from cross slot 138 (Figures 5 and 6), thus releasing the pin theretofore held by the gate 136, cam 117 during this action leaving gate 135 in closing position and entered into the slot 137, thus to hold back the pins that are lined up in channel 101 between the gate 135 and the region A of tangency. The single pin thus released rapidly slides down along the steeply inclined channel extension 127 and becomes assembled to the recess 87 in plunger 45 in the manner above described.

The downward stroke of drill 46 and upward stroke of plunger 45 now commence and also the gate 136 is returned to closing position and gate 135 is moved to releasing or open position, allowing the aligned pins in channel 101 to slide downwardly by a distance equal to the length of a pin, the foremost pin and hence the moving row of pins being stopped by closed gate 136. Thus also the channel 101 in the region A of tangency is cleared for the reception of another pin.

The channel 101 is preferably of a length appropriate to accommodate a suitable number of pins, such as that suggested in Figure 6, so that gates 135 and 136 may function to release individual pins to the throat and plunger in the event that several slots 100 should be brought around to the region A of tangency in an empty condition.

The gates 135 and 136 have arms 135ᵇ and 136ᵇ pinned or otherwise secured to shafts 141 and 142 respectively mounted in bearings formed in a bearing block 143 secured as by screws 144 to the upper face of the channel carrying member 127, and shafts 141 and 142 have secured to them lever arms 145 and 146 which at their outer ends (Figure 5) overlie and are engaged by the cam follower rods 119 and 118 respectively. Any suitable means may be employed to bias the gates into closing position, and conveniently the weight of the parts, including the weight of the lever members 145 and 146 may serve that purpose, acting also to maintain the lever arms in engagement with the cam follower rods. Preferably lever arm 145 overlies lever arm 146, the latter being suitably apertured as at 146ᵃ to permit the free passage therethrough of cam follower rod 119 into engagement with the lever arm 145.

The above-mentioned upward stroke of plunger 45 and control of its return stroke is preferably achieved by a cam 147 on the main drive shaft 77 (Figures 1, 3 and 4), shaped as shown in Figure 1, with the drive of shaft 77 being counterclockwise. Coacting with cam 147 is a cam follower or roller 148 rotatably supported by a pin 150 between the bifurcations 151ᵃ and 151ᵇ of a lever 151, whose left-hand end 151ᶜ, as seen in Figure 1, is pivotally supported by a shaft or pin 152 carried by two spaced bosses 153 and 154 projecting downwardly from the base 25.

At the right-hand end as seen in Figure 1, the lever parts 151ᵃ—151ᵇ, which extend to either side of the downwardly extending guiding boss 85 for the plunger 45 (Figure 5), have pivotally secured to them, as by pins 155 and 156, links 157 and 158 respectively which, at their lower ends, pivotally engage as by pins or trunnions 161 and 162 a plunger carrier 163 of appropriate vertical extent and having a vertical bore or hole 164 therein in which is received the lower end of the plunger 45.

The above-mentioned downward stroke of the drill, taking place just about concurrently with the upward stroke of the plunger 45 is preferably achieved by a cam 177 on the main drive shaft 77 (Figures 1, 3, 4 and 5) shaped as is better shown in Figure 1 and coacting with a cam follower or roller 178 rotatably supported by a pin 180 in a lever 181 whose left-hand end is pivotally supported by the pin 152 and whose right-hand end (Figure 1) extends beyond and to the rear of the plunger operating lever 151 so that it underlies a push rod 182 that extends vertically through the base 25 which is formed to provide a suitable vertically extending boss 183 to guide and aid in supporting the push rod 182.

The upper end of push rod 182 is threaded into the lower end of a bifurcated member 184, locked as by a lock nut 185, member 184 carrying a pin 186 by which a pivotal connection is effected with an arm 187 secured to a shaft 188 rotatably supported in horizontal bearings 190 (Figures 1 and 5) formed in the vertical drill-spindle guide frame 191, the latter being secured as by screws 192 to the upper end of a standard 193 which rests upon the bed or base 25 which is secured as by screws 194.

The frame 191 is sleeve-like or elongated in form and supports therein non-rotatably but vertically slidable a sleeve-like spindle support 195 provided in any suitable way with suitable combined radial and thrust bearing, one of which is indicated at 196 for rotatably supporting the shaft or spindle 197 so that the latter may freely rotate but must partake of up and down movement with the spindle support 195.

At its lower end, the shaft 197 is provided with a suitable chuck 198 to receive the drill 46 and at its upper end the shaft 197 has a splined connection (not shown) with a pulley 200 by which it is driven at a suitable drilling speed, a belt 201 extending from pulley 200 to a pulley 202 mounted on the shaft of a motor 203 secured to the upper end of the upright standard 193.

Intermediate of the bearings 198 (Figure 5) the spindle supporting frame 190 is cut away to expose the teeth formed in the spindle support 195, thus to form a rack 204 and meshing with the rack 204 are the teeth of a sectional gear 205 rigidly secured to the shaft 188 and accommodated between the spaced bearings 190.

As is better seen in Figure 1, cam 177 is shaped substantially similar to the plunger controlling cam 147 and is substantially aligned with the latter so that the rise and fall of both lever arms 151 and 181 take place substantially in synchronism or unison. The upward swing of lever 181 raises the push rod 182 and through the gearing 205—204 the drill spindle and drill 46 are lowered to an extent, and at a drilling rate to cause the drill to drill a hole in the sleeve 20, the penetrating end of the drill being accommodated in a helical groove 39ˣ; downward swing of the lever 181 reverses the movements, the drill being withdrawn, and in this connection any suitable means such as the weight of the lever 181 may be used to cause the lever faithfully to follow the cam 177 and such means as the weight of the push rod 182 and connected parts may serve to keep the push rod with the end of lever 181 and cause it faithfully to follow also the downstroke of the lever 181. Due to the substantial synchronization of levers 151 and 181, the plunger 45 moves up as the drill moves down, and vice versa, the pressure effects of the two upon the sleeve 20 and its mandrel support being substantially counterbalanced.

With the mandrel and the sleeve 20 rotated step by step and axially advanced in the directions indicated and with the advance displacement of the locus of operation of the drill 46 from the locus of operation of the plunger 45, the drill drills the holes successively and in advance of the operation of the throat elements and plunger, thus providing the sleeve element 20 with the holes into which the other coacting mechanisms operate to set pins, and in the illustrative embodiment there is a 180° extent of drilled holes always ahead of the point where the plunger operates.

Where the pins P are threaded, as in Figure 9, so that the pin undergoes rotary movement as it is forced under substantial pressure into a hole H in the sleeve 20, the plunger 45 is preferably supported in the carrier 163 so that the plunger also may partake of rotary movement with the pin. For this purpose I preferably interpose between the lower end of plunger 45 and the bottom of the bore 164 a hardened steel ball 165 (Figure 5) preferably giving the end face of the plunger 45 a concavity to form a seat 166 to hold the ball 165 coaxially of the plunger 45, thus to bring its point of tangency with the bottom of the bore 164 in coincidence with the vertical axis of the plunger and thus insuring ease or nicety of rotary movement of the plunger relative to its carrier 163.

Whether or not the plunger 45 is mounted for rotary movement, I preferably provide suitable means for adjusting the extent to which the upper end of the plunger 45 approaches the axis of the mandrel 39 (Figure 5), in order to facilitate accommodating the apparatus to various requirements such as changes in diameter of the sleeve 20, different lengths of pins, and the like, but also to insure that, for given conditions, the upward stroke of plunger 45 is such as will bring the end faces of all of the pins, whether the latter are threaded or not, into coincidence with the inner cylindrical surface of the sleeve 20 even though the outer cylindrical face of the mandrel 39 is under-cut by way of grooves 39$^x$.

A convenient and preferred means comprises a screw 167 threaded into the lower end portion of the bore 164 of the carrier 163, the end face of the screw 167 thus forming the bottom wall of the socket-like bore 164 into which the lower end of the plunger 45 is seated, and with otherwise fixed stroke of up and down movement of the carrier 163, as by the lever 151 and cam 147 (Figure 1), the plunger 45 may be raised or lowered relative to the carrier 163, by adjusting the screw 167 which may be locked as by the lock nut 168, thus permitting accurate fixing of the upper limit of movement of the upper end face of the plunger 45. Thus, though the holes H due to such factors as the helical grooves 39$^x$, extend all the way through the wall of the sleeve, the plunger may be set to force the pins home into the holes always to the same depth and with their inner ends terminating, for example, in coincidence with the inner face of the sleeve or falling just short thereof, so as not to present any inward protrusions to interfere with the removal of the sleeve element from the mandrel or to interfere with slipping the sleeve element with others onto the rotary shaft or support when it is assembled for ultimate use.

As above noted, the plunger 45 is nicely guided in its up and down stroke by the bore 86 in the guiding bosses 85, and due to the connection of carrier 163 to the lever 151 by the links 157—158, the carrier 163 follows the straight line of up and down motion determined by the guiding of the plunger 45 in the bore 86, the links 157—158 partaking of a slight amount of swing (see Figure 1) about their lower pivotal connections 161—162 as the axis of the upper pivotal connections 155—156 to the lever 151 partakes of a relatively small arcuate motion under the control of cam 147. But the links 157—158 insure, during the upward stroke of the plunger, a nicely balanced and positive application of driving force to the carrier 163 and hence to the plunger, and thus each pin may be dependably pressed or forced into the above-described anchoring relationship to the material forming the walls of its hole H in the sleeve 20, and moreover, each one of the numerous pins becomes positioned at exactly the same distance from the axis of the sleeve 20 so that the centers of mass of all of the pins are equidistant from that axis and with equal spacing about the circumference of the sleeve 20, nicety of dynamic balance results.

In Figures 1 and 5, the drill 46 is shown in its lowermost position and the plunger 45 is shown in its uppermost position, the drill controlling cam 177 having its highest point in engagement with the cam roller 178 and the cam 147 having its highest point in engagement with the cam roller 148, it being noted that as the plunger moves from the position shown in Figure 7 to that shown in Figure 5, throat elements 81 and 82 are displaced in counterclockwise and clockwise directions, respectively, by the action of the plunger 45 itself, the bias of the throat elements urging and holding them against the sides of the plunger 45, as shown in Figure 5, and biasing and moving them back into the positions shown in Figure 7 as the plunger recedes or moves downwardly from the position of Figure 5 to that of Figure 7.

During the upward stroke of plunger 45, the drill 46 is given a steady downward stroke, and the mandrel 39 and hence sleeve 20 are held in fixed position with a previously drilled hole H of that particular helix or row presented to and fixedly held in line with the upwardly moving pin carried by the plunger, the drill meanwhile commencing the drilling operation to provide a hole 180° in advance, and as the plunger recedes and hence moves downwardly as a result of movement of cam 147 in counterclockwise direction from the position shown in Figure 1, it being noted that the weight of the plunger 45, carrier 163 and lever 151 insure biasing of the cam follower always into engagement with the cam 147, cam 116 (Figures 1 and 5) continues to hold gate 135 closed, the cam follower 118 thereof being still on a low part of the cam, while cam 117, having opened the gate 135 (Figures 5 and 6) shortly after cam 116 has closed the gate 136, such closure having taken place shortly after release of a single pin while the plunger 45 is in its lowermost position, now moves the gate 135 in closing position, thus to hold back the row of pins P in the channel 101 to the right of the gate 135, and thus preparing for the release by gate 136 of the single pin held by the latter in advance or to the left of gate 135.

Following the withdrawal upwardly of the drill 46 and downwardly of plunger 45 from the pointed end of a pin just driven home by the plunger, cam 75 (Figures 1, 3 and 4) actuates the ratchet operating bar 67 (Figures 2, 3 and 4) in an upward stroke followed by a retrograde stroke (see the hump in cam 75 of Figure 1 displaced about 90° from the highest point of cam 147), thus to actuate the ratchet 66 to rotate the mandrel 39—40 throughout the angle subtended by two successive holes H in a row and by the coaction between the threaded block 47 and the threads of part 40 to advance the mandrel slidably along its support 36 by the right amount, locking pawl 60 acting to lock the rotated parts accurately in their new position.

By that time the lowest portion of cam 177 holds the drill in uppermost position and the lowest portion of cam 147, that portion being of about 90° extent and of about the same radius throughout, comes into coaction with the cam follower 148, thus to hold the plunger in its lowermost position as shown in Figure 7, with the throat forming elements 81—82 restored to coacting relation with the pin receiving socket 87 in the plunger, and just about when the plunger arrives at its lowermost position, a high portion of cam 116 rides the cam follower 118 upwardly to lift the gate 136, thus releasing the single pin that had been isolated between the two gates 135 and 136, that pin quickly moving down the channel extension 127 to be entered into the plunger recess 87 as was above described.

Then the gradually rising portion in the upper left-hand quadrant, as viewed in Figure 1, of cam 147, comes into action upon cam roller 148, progressively and steadily forcing the plunger to the uppermost extreme of its upward stroke to seat and embed the pin carried by it in the sleeve 20, but just about when that movement begins or shortly thereafter, cam 116 closes the gate 136 and shortly after such closure cam 117 opens gate 135 to permit the row of pins in channel 101 to slide downwardly to be stopped by closed gate 136, and shortly thereafter cam 117 closes gate 135 in order thus to place the single pin between it and gate 136 under the sole control of gate 136. A similar gradually rising portion of the cam 177 operates substantially synchronously to steadily bring the drill 46 downwardly to perform its drilling operation.

Such sequences of steps to constitute a complete cycle thus take place during a single revolution of main drive shaft 77 and of cam shaft 104, the ratio of driving connection between the two being 1 to 1, whence the cycle repeats itself in rapid succession, illustratively at a rate to anchor about 60 pins per minute.

The main drive shaft may be driven in any suitable manner, conveniently by way of an electric motor 171 which may be secured to the underside of base 25 as indicated at 172 in Figure 1, whence a drive chain 173 connects the motor sprocket 174 with a sprocket 175 mounted on the rear end of shaft 77.

Where the holes H in the sleeve member 20 are to be arranged helically, the operation, after having assembled a blank sleeve to the mandrel 39, is commenced by first manually setting the structure 39—40 toward the left of the position shown in Figure 1, the drive being halted for that purpose and the thread block 47 being withdrawn from engagement with the threads of part 40 so as to permit manual sliding of the structure along the supporting shaft 36 and to permit positioning the mandrel structure in a rotary sense, locking pawl 60 being yieldably mounted while driving pawl 66 may be disengaged if necessary, to bring that portion of the sleeve 20 where the first hole of a helix is to be drilled directly underneath the drill 46. The location or point where the drill will drill the first hole of a helical row becomes definitely fixed by the inter-engagement of the thread block 47 with the threads of part 40.

Next I provide suitable means to prevent or delay pin-setting action by the plunger and related mechanisms until, after the drive has been started, a step by step succession of holes has been drilled by the drill 46 sufficient, being 180° in extent in the described embodiment, to present the first drilled hole to the locus of operation of the plunger, and thereby also preclude jamming the apparatus as might happen if the plunger were to be forced to attempt to set a pin into an un-drilled portion of the sleeve member 20. A preferred arrangement for accomplishing this comprises a control of the gate 136 (Figures 6 and 14) to hold it in stopping position until that cycle at which the first drilled hole of the helix is presented to the locus of operation of the plunger.

Figures 14, 16:
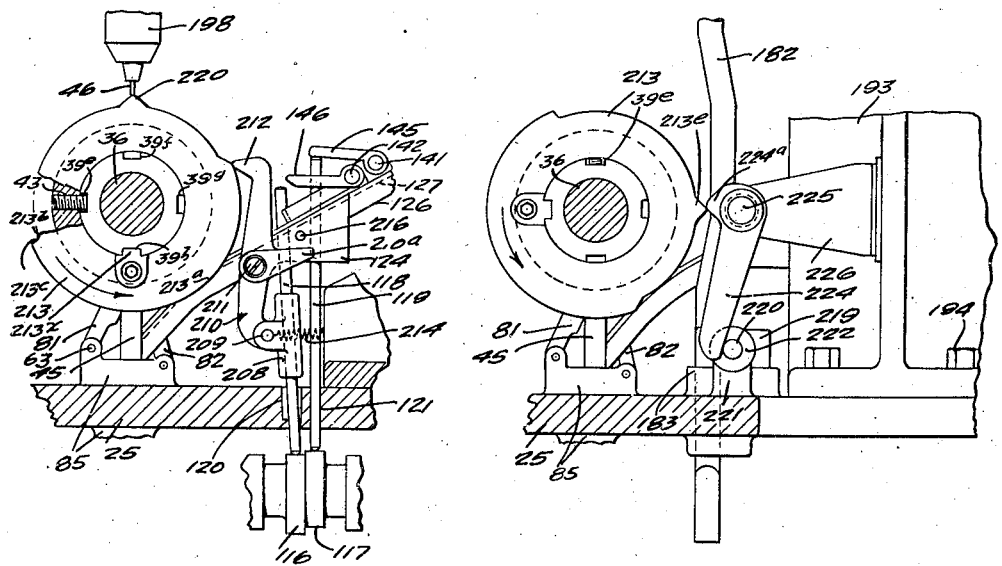
Figure 14 is a fragmentary view as seen along the line 14—14 of Figure 12, showing certain of the parts as they are interrelated upon drilling the first hole.
Figure 16 is an end elevation or transverse section as seen along the line 16—16 of Figure 15.

Preferably, I interrupt the drive of the gate 136, and do this preferably by displacing the cam follower or push rod 118 out of engagement with the gate lever 146, as is better shown in Figure 14, where the aperture 120 in the base 25 and the aperture 122 in the block 124 are shown elongated in a direction toward the left so as to permit the push rod 118 to be tilted in counterclockwise direction from its normal or operating vertical position to a sufficient extent to bring its upper end, while maintaining its lower end in contact with the cam 116, sufficiently to the left of the free end of lever 146 so as to clear the latter during its up and down strokes of movement, the under end portion of lever 146 being tapered or cam-shaped to insure re-entry of the upper end of push rod 118 underneath the lever 146 when the driving connection is to be restored, as is later described.

About an intermediate portion of push rod 118 is an elongated sleeve 208 pivotally mounted by pin 209 at the lower end of a lever 210 that is pivotally supported by a screw stud 211 threaded into a suitable boss in the downwardly inclined channel member 126; the upper end of lever 210 is shaped as at 212 to provide a cam follower for coaction with a peripheral cam 213.

Lever 210 is biased in counterclockwise direction as viewed in Figure 14 by a spring 214 (see also Figures 13 and 15) one end of which is connected to the pivot pin 209 and the other end of which is anchored to a frame part such as the upright 193, as by pin 215. If unrestrained, the tension of spring 214 swings lever 210 counterclockwise sufficiently to tilt the push rod 118 in clockwise direction (Figure 14) to bring its upper end underneath the gate lever 146, a pin 216 projecting from the block 124 being engaged by a lug 210a projecting from lever 210 in order to limit the extent of clockwise tilting of push rod 118 to just about its normal or vertical operating position.

Cam 213 is rotatable and movable with the mandrel structure 39—40 and is preferably mounted for adjustment with respect thereto. Preferably, as is better shown in Figures 1, 2, 13 and 14, I utilize collar 42 as a carrier for cam 213 and I may, and preferably do, form the cam 213 integral with the collar 42, and where a fixed relationship of the row or rows of holes in the sleeve member 20 is desired with respect to the fixed cut-outs 20ᵃ (Figure 1) with which the annular shoulder 41 interfits as above described, I preferably provide suitable means for fixedly relating the cam 213, in a relative rotary sense, to the mandrel structure, and this I may achieve as by a slot 39ᵉ in the end portion of the mandrel 39, and where the holes are to be drilled and the pins set in the pattern of a multiple helix, such as the four above-mentioned helical rows R—1, R—2, R—3 and R—4, I provide four such slots, namely, slots 39ᵉ, 39ᶠ, 39ᵍ and 39ʰ, and provide the hub or collar element 42 of the cam with an inwardly radially extending key or projection 213ˣ (Figures 13 and 14) set into a suitable recess in the end face of the collar-cam structure 42—213 and fixedly secured as by a screw 217, and with the four slots equi-angularly spaced, set screw 43 and the key 213ˣ are spaced 90° apart as shown in Figures 14 and 16. The slots are open-ended (Figure 13), and by loosening set screw 43, the structure may be slipped onto the mandrel in an axial direction in any one of four rotary positions, each related to one of the above-mentioned desired helical rows of holes and pins.

In Figures 12, 13 and 14, the parts are shown positioned in readiness to drill the first hole of, for example, row R—1, sleeve 20 having its cut-out 20ᵃ (Figure 12) interfitted with the stepped shoulder 41 of the mandrel and key 213ˣ being in the slot 39ʰ with set screw 43 tightened up against the bottom of slot 39ᵉ, and in that position the high peripheral portion 213ᵃ of the cam (the part rotating in counterclockwise direction, as seen in Figure 14) has its initial portion thus brought into engagement with the lever 210 which is thereby held swung clockwise against the tension of spring 214, thus holding push rod 118 out of engagement with the gate lever 146 so that the ensuing up and down strokes of the push rod under the action of cam 116 do not actuate the gate 136. The step by step drilling commences, upon starting the apparatus, and continues, the gate 136 remaining closed until the drill has drilled enough holes corresponding to the displacement, in the illustrative embodiment 180°, between the locus of operation of the drill and the locus of operation of the pin-setting plunger 45, or in other words, until the first hole drilled by the drill 46 is in position to have the plunger 45 set a pin into it; accordingly, the high peripheral portion 213ᵃ of the cam 213 is of that arcuate extent, namely 180°, whence there is a drop to the portion 213ᵇ of the cam, that change in the cam periphery permitting lever 210 to swing in counterclockwise direction under the tension of spring 214, thus restoring push rod 118 to its position underneath the gate lever 146 whence the gate 136 is actuated, being timed as earlier above described with the other moving parts, to transfer a pin to the throat elements and to the plunger 45 for insertion into that first hole, whence step-by-step drilling, step-by-step pin transfer, and step-by-step pin-setting continue in timed relationships, as earlier above described.

As earlier above noted, the step-by-step movement of the supporting structure, such as the mandrel structure 39—40, for the sleeve 20, is a step-by-step rotary movement in the direction of the arrows shown on the drawings and a step-by-step movement in a direction toward the right as viewed in Figures 1, 2, 13, 14 and 15, where the pattern in which the holes are drilled and pins are set is helical. At the commencement of the operation, that is, when the first hole is drilled, the mandrel structure and the sleeve 20 are in their left-most position, as shown in Figures 12 and 13, and the extent in an axial direction of the cam follower 212 of the lever 210 or the axial extent of the portion 213ᵃ of the cam 213, or both, is so proportioned that, with the cam 213 moving with the mandrel structure, the cam 213 becomes displaced to the right of the cam follower 212, as viewed in Figure 13, shortly after the cam follower 212 has been tripped inwardly toward the axis at the relatively sharp step 213ᶜ (Figure 14), thereby, as the cam continues its step-by-step rotary movement and step-by-step movement toward the right (Figure 13) to avoid interference with the pin-transferring and pin-setting mechanisms during their required subsequent operations. Though the cam follower 212 is in this manner disengaged from the lower cam portion 213ᵇ, spring 214 continues to hold the push rod 118 in operative relation to the gate lever 146, lever lug 210ᵃ and pin 216 acting during this interim to fix the just-stated position of push rod 118 under the action of spring 214.

As the drilling and pin-anchoring operations continue, the point is reached where the last hole of the helix of holes is to be drilled, and at that point I provide suitable means for preventing further drilling operations by the drill, leaving the rest of the mechanism to continue so as to conclude the setting of pins in the 180° extent of holes that would at that point remain in advance of the locus of operation of the plunger. A simple and convenient way for effecting such cessation of the drilling operation in advance (by 180°) of stopping the pin-setting operation, the latter being accomplished preferably by stopping the drive of the entire apparatus, comprises provisions for interrupting the working strokes of the drill, conveniently by shifting the push rod 182 (Figure 1), at its lower end, to the right and thus disengaging it from the lever 181. Thus the boss 183 and the base 25 have a longitudinally extending slot 218 so that the lower end of the push rod may be moved to the right in Figure 1 about the pivot pin 186 at its upper connection, as a pivot, and such movement, and subsequent restoration into coacting relation with the lever 181 may be achieved as by a yoke 219 (Figures 12, 13 and 15) suitably mounted above the upper face of the base 25.

Thus, the yoke 219, between the arms of which push rod 182 passes (Figure 13), rests slidably against the upper face of the boss 183, and is guided for movement in the direction of the slot 218 by a stud or rod 220 slidably mounted in an upstanding boss 221 formed in or secured to the base 25; at its right-hand end, the rod 220 has secured to it a collar 222 and between the collar and the fixed boss 221 is a coil spring 223 which normally biases the yoke 219 in a direction toward the right as viewed in Figures 12 and 13.

As is better shown in Figures 12 and 16, I provide a latch arm 224 for coaction with the collar 222, latch arm 224 being pivotally supported by a pin 225 mounted in a bracket 226 secured as by screws 227 to the frame upright 193.

With the push rod 182 in engagement with the lever 181, and preferably the latter is provided with a recess 181ᵃ (Figure 12) and the lower end of push rod 182 may be shaped as shown to better seat itself in the recess 181ᵃ, the slide rod 220 of the yoke 219 held in a leftward position, as shown in Figure 12, with the spring 223 compressed, by swinging the latch lever 224 in position to the right of the collar 222 to an extent permitted by the free end portion of the rod 220, (as is better shown in Figure 16); thereby yoke 219 is held in position to maintain the lower end of push rod 182 in alignment with the recess 181a of the lever 181, the push rod 182 partaking of up and down strokes in response to the actuation of lever 181 from the cam 177 whose lowest portion, that is, the portion of smallest radius, is preferably such that it permits the free end of the lever 181 to assume a lowermost position to unseat the push rod 182 from the seat 181a, though re-seating takes place upon each upstroke of the lever 181 so long as the yoke 219 is held in the above-mentioned position as shown in Figure 12.

In positioning the latch lever 224 as above described (see Figure 16), a laterally projecting portion 224a of the latch lever 224 is given a position substantially like that shown in Figure 16, being substantially in the helical path of movement of a projecting portion 213e of the cam 213, related to the other portions substantially as shown in Figure 16.

As the above-mentioned cycles of drilling, pin-transferring and pin-setting are repeated, and as the drill 46 approaches the point in the step-by-step rotary and axial movement of the mandrel and hence of the cam 213 where it is about to drill the last hole of the selected helical row of holes, the cam structure 213 reaches an axial position corresponding almost to its extreme right-hand position and hence into coacting relation to the cam follower portion 224a of the latch lever 224, the last hole is drilled, whence the next step of rotary movement of the mandrel structure and hence of the cam 213, being in counter-clockwise direction as viewed in Figure 16, causes the cam part 213e to engage the latch lever part 224a and trip or swing the latch lever 224 in clockwise direction and hence out of engagement with the collar 222, thus releasing spring 223 to move the yoke 219 toward the right as viewed in Figure 12 and from the position shown in Figure 13 to the position shown in Figure 15; this action occurs during those portions of a cycle that find the lever 181 (Figure 12) in lowermost position in which the lower end of push rod 182 is out of engagement with the seat 181a of the lever, thus giving the spring 223 complete freedom to swing the push rod 182 to the right and into the dotted line position shown in Fig. 12, the subsequent upstrokes of the lever 181 being thereby ineffective to give the push rod 182 and hence the drill any working strokes.

The drilling operations are halted and the drill remains in uppermost or out-of-the-way position, whence the setting of pins in the still empty holes (of about 180° extent) continues, the drive of the apparatus being stopped when the last pin is set.

If the sleeve member 20 is to have more than one helix of pins, as was above initially assumed, the general sequence of steps above described is repeated, once for each additional helix, but only after disengaging the thread block 47 from the thread part 40 to axially and rotatably reset the mandrel and the sleeve 20 to the starting point for the second helix of holes, and then re-engaging the thread block, and resetting the rotary position of cam 213 and its carrier collar 42 by bringing the key 213x into one of the mandrel slots corresponding to the next helix and then setting the lock screw 43, as above described, but now with respect to the second helix to be drilled and pin-set.

Thus, if there are four helixes of holes to be drilled and fitted with pins, the four helixes start at equi-angularly spaced points and hence at points spaced 90° from each other, and accordingly the mandrel part 39 has the above-mentioned four slots 39e, 39f, 39g and 39h similarly spaced equi-angularly and hence by 90°, and thereby the cam structure 42—213 can be set in four different angular relationships, one for each helix.

Each such setting of the cam structure insures that, for each helical row, drilling commences at the right point, pin-setting is delayed until the space differential between the locus of operation of the drill and locus of operation of the pin-setting plunger is compensated for by the drilling of holes (illustratively, throughout 180°), in the embodiment above described, and that drilling ceases at the right point to terminate each helix at the right point, while permitting continued pin-setting operations after the last hole has been drilled, whence the apparatus may be stopped, as by opening the circuit of the driving motor by means of any suitable switch, (not shown). Accordingly, with the cam structure once set for a particular helix, and the apparatus is started, it continues to function without attention until the last pin is set whence it is stopped as it has to be in order to re-set the cam 213, or to replace the sleeve member 20 by another. Thus dependable uniformity of construction throughout all of the pin-set sleeve elements can be achieved.

As the supply of pins in the magazine structure 89 diminishes, more are added thereto and upon completion of assembly of pins to a sleeve member 20 carried by the mandrel 39, the apparatus is stopped, collar 42 of the mandrel 39 is released and the supporting standard 28 removed, whence the completed picker roll section is removed from mandrel 39 and another sleeve 20 slipped onto the mandrel 39 whence the collar 42 and the standard 28 are replaced, the new sleeve member 20 being properly fixed in position by the interlocking of its left-hand end portion (Figure 1) with the annular stepped shoulder 41.

With the sleeve element 20 and the pins P of materials or relative proportions as earlier above described, the resistance to entry of the pins into their respective holes in the hollow cylindrical or sleeve element 20 may be substantial, but the drive of the plunger 45 takes place under adequate force or pressure to force-fit the pins, whether the latter are threaded or not, and dependably anchor them into the sleeve element, and where threaded pins are employed, such as the pin of Figure 9, the lower ends of the threads preferably terminate short of the butt end of the pin so as to leave a short axial length of unthreaded shank of the pin for nicety of initial guiding or entry of the shank into its hole, while the preferred rotary mounting of the plunger 45 in the carrier 163, as by the bore 164 and ball 165, gives such ease or facility of rotation to the plunger that, even under the substantial forces or pressures which it exerts, the rotary movement of the pin in cutting its own thread is transmitted to the plunger with so little resistance that damage or distortion to the fin-like cutting threads on the pin or to the threads which it cuts into the walls of the hole is minimized or guarded against.

Thus it will be seen that there has been provided in this invention an apparatus in which the several objects hereinabove set forth together with many thoroughly practical advantages are successfully achieved. The apparatus is of dependable action and capable of high-speed synchronized hole-drilling and of assembly, with good anchorage, of the large number of pins to each sleeve element, and is capable of ready and facile control. Also uniformity of distribution of the pins is assured, thus making for nicety of dynamic balance, each pin being anchored or fixed at the same distance from the axis of the sleeve element. Also the apparatus is capable of exerting, even though operating at substantial speed, the relatively large forces or pressures appropriate to achieve the desired embedding or anchoring of the pin shanks in the material of the sleeve element.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. An apparatus for drilling holes in a support and for setting pins therein, said apparatus comprising means for moveably supporting the support, moveable drill means, a moveable element for carrying a pin and forcing it into a hole in the support, mechanism for effecting step by step movement of said support and operating during pauses in the movement to actuate said pin-forcing element to seat a pin in a hole in said support and to actuate said drill means to drill a hole therein at a point in advance of the point of operation of said pin-forcing element, and means operating in timed relation to said mechanism for precluding pin-forcing operation by said element until sufficient holes have been drilled by said drill means for said support to present a drilled hole to said element.

2. An apparatus for drilling holes in a support and for setting pins therein, said apparatus comprising means for moveably supporting the support, moveable drill means, a moveable element for carrying a pin and forcing it into a hole in the support, mechanism for effecting step by step movement of said support and operating during pauses in the movement to actuate said pin-forcing element to seat a pin in a hole in said support and to actuate said drill means to drill a hole therein at a point in advance of the point of operation of said pin-forcing element and said mechanism including means operating in timed relation to said step by step movement for feeding pins to said element, and means operating in timed relation to said step by step movement for delaying pin-feeding actuation by said last-mentioned means until said drill means has drilled sufficient holes to present the leading hole to said pin-forcing element.

3. An apparatus for drilling holes in a support and for setting pins therein, said apparatus comprising means for moveably supporting the support, moveable drill means, a moveable element for carrying a pin and forcing it into a hole in the support, mechanism for effecting step by step movement of said support and operating during pauses in the movement to actuate said pin-forcing element to seat a pin in a hole in said support and to actuate said drill means to drill a hole therein at a point in advance of the point of operation of said pin-forcing element, means for holding a supply of pins and mechanism, operating in timed relation to said first-mentioned mechanism for effecting transfer of pins from said supply means to said pin-forcing element, and control means for said second-mentioned mechanism for preventing transfer of pins to said element for as many step by step movements of said first-mentioned mechanism as are needed to present the first drilled hole to said pin-forcing element.

4. An apparatus for drilling holes in a support and for setting pins therein, said apparatus comprising means for moveably supporting the support, moveable drill means, a moveable element for carrying a pin and forcing it into a hole in the support, mechanism for effecting step by step movement of said support and operating during pauses in the movement to actuate said pin-forcing element to seat a pin in a hole in said support and to actuate said drill means to drill a hole therein at a point in advance of the point of operation of said pin-forcing element, and means for halting the step by step drilling operations of said drill means in advance of halting said pin-forcing element so that the latter may continue to set pins in such holes as said drill means has drilled in advance of the pin-forcing element.

5. An apparatus for drilling holes through the wall of a hollow cylindrical support and for setting pins in said holes, said apparatus comprising a mandrel for supporting said hollow cylindrical support, said mandrel being undercut externally to provide space for accommodating the end of a drill after completing the drilling of a hole through said support, drill means, a pin-forcing element, mechanism for effecting step by step movement of said mandrel and said support relative to said drill means and said element with the former positioned in advance of the latter, mechanism operating during the pauses in said step by step mandrel movement for actuating said drill means to drill a hole through the support wall and to enter the drill in said space to insure complete drilling of the hole, and mechanism operating during said pauses to actuate said element in pin-forcing direction to the same extent at each pause to force pins into the drilled holes, one pin for each hole, and each pin to the same distance from the axis of said hollow support.

6. An apparatus for drilling holes through the wall of a hollow cylindrical support and for setting pins in said holes, said apparatus comprising a mandrel to receive said cylindrical support thereon, said mandrel being recessed to provide space for accommodating the emerging end of a drill drilling through the wall of said support and thereby leaving intervening surface portions of the mandrel to give internal support to said hollow cylindrical support, drill means, means mounting said drill means and said mandrel for relative step by step movement along the line of the recessing in said mandrel, means operating during pauses in said step by step movement to actuate said drill means to drill a hole at each pause through the wall of said hollow support and to enter the drill into said space to insure complete drilling of the hole, and pin-forcing means having mechanism actuating it in timed relation thereto in pin-forcing direction to the same extent at each pause to force pins into said holes, one at each pause, and each to the same spacing of its inner end from the axis of said support.

7. An apparatus for drilling holes through the wall of a hollow cylindrical support and for setting pins therein, said apparatus comprising a mandrel for receiving said support thereover, said mandrel having a plurality of helical grooves to provide spaces for accommodating the emerging end of a drill drilling through the wall of said support and to provide intervening helical rib elements to back up said wall, drill means, a pin-forcing element, means mounting said mandrel and said drill means and element to effect relative step by step movement therebetween along the line of a helix having the pitch of said helixes and with said drill means in advance of said element, means for selectively determining along the line of which of said plurality of helixes said relative step by step movement is to take place, means operable during pauses in said movement to actuate said drill means to drill a hole through said wall whereby the emerging drill end is always accommodated in the selected helical groove, and means operable during pauses in said relative movement to actuate said element to force a pin into a drilled hole.

8. An apparatus for drilling holes in a cylindrical support and for setting pins therein, said apparatus comprising means for supporting said support, drill means, a pin-forcing element, means mounting said supporting means and said drill means and said pin-forcing element to effect relative step by step movement therebetween along any one of several helical lines, means for selectively determining along which of said several helical lines said relative step by step movement is to take place, means operable during pauses in said movement to actuate said drill means to drill a hole in the cylindrical support supported by said supporting means whereby a helical row of holes may be drilled in said support, and means operable during pauses in said relative movement to actuate said pin-forcing element to force a pin into a drilled hole.

9. An apparatus for drilling holes in a cylindrical support and for setting pins therein, said apparatus comprising means for supporting said support, drill means, a pin-forcing element, means mounting said supporting means and said drill means and said pin-forcing element to effect relative step by step movement therebetween along any of several helical lines and including a multiple-threaded element and a nut element having means mounting them for relative movement into and out of engaging relation for thereby selectively making effective any one of the threads of said multiple-threaded element and thereby determining along which of said several helical lines said relative step by step movement is to take place, means operable during pauses in said step by step movement to actuate said drill means to drill a hole in said cylindrical support whereby a helical row of holes may be drilled therein, and means operable during pauses in said relative movement to actuate said pin-forcing element to force a pin into a drilled hole thereby to assemble a helical row of pins to said support.

10. An apparatus for drilling holes in rows in a cylindrical support and for setting pins in the holes, said apparatus comprising means for supporting said cylindrical support, drill means, pin-forcing means, means mounting said supporting means and said drill means and pin-forcing means for relative step by step movement along the line of the desired row of pins to be effected and with said drill means in advance of said pin-forcing means, means operable during a pause in said step by step movement for actuating said drill means to drill a hole in said support, means operable during a pause in said step by step movement to actuate said pin-forcing means to force a pin into a hole in said support, and means actuating said two last-mentioned operable means in timed relation to said step by step movement each in a sequence of as many steps as correspond to the number of pins to be set in a row on said support, but with the commencement of the sequence effected by said pin-forcing means delayed to correspond to the number of steps that said drill means is in advance of said pin-forcing means.

11. An apparatus for drilling holes in rows in a cylindrical support and for setting pins in the holes, said apparatus comprising means for supporting said cylindrical support, drill means, pin-forcing means, means mounting said supporting means and said drill means and pin-forcing means for relative step by step movement along the line of the desired row of pins to be effected and with said drill means in advance of said pin-forcing means, means operable during a pause in said step by step movement for actuating said drill means to drill a hole in said support, means operable during a pause in said step by step movement to actuate said pin-forcing means to force a pin into a hole in said support, and means for holding said pin-forcing means ineffective at the commencement of said step by step movement for as many steps in the latter as correspond to the number of steps that said drill means is in advance of said pin-forcing means.

12. An apparatus for drilling holes in rows in a cylindrical support and for setting pins in the holes, said apparatus comprising means for supporting said cylindrical support, drill means, pin-forcing means, means mounting said supporting means and said drill means and pin-forcing means for relative step by step movement along the line of the desired row of pins to be effected and with said drill means in advance of said pin-forcing means, means operable during a pause in said step by step movement for actuating said drill means to drill a hole in said support, means operable during a pause in said step by step movement to actuate said pin-forcing means to force a pin into a hole in said support, and means for halting the actuation of said drill means after it drills the last hole of a row while permitting continued actuation of said pin-forcing means to set pins in the holes that remain in advance of said pin-forcing means.

13. An apparatus for drilling holes in rows in a cylindrical support and for setting pins in the holes, said apparatus comprising means for supporting said cylindrical support, drill means, pin-forcing means, means mounting said supporting means and said drill means and pin-forcing means for relative step by step movement along the line of the desired row of pins to be effected and with said drill means in advance of said pin-forcing means, means operating in timed relation to said step by step movement for actuating said drill means to drill a hole during each pause in said movement, and means operating in timed relation to said step by step movement to actuate said pin-forcing means to force a pin into a hole during each pause, means for holding a plurality of pins with means operating in timed relation to said step by step movement and including a gate member for effecting transfer of a pin to said pin-forcing means once for each step of said movement, and means for holding said gate member against actuation.

14. An apparatus as claimed in claim 13 provided with means for releasing said pin-holding means upon the completion by said drill means of the drilling of a number of holes at the beginning of the row corresponding to the number of steps of said movement that said drill means is in advance of said pin-forcing means.

15. An apparatus for drilling holes in a support and for setting pins therein, said apparatus comprising means for movably supporting the support, movable drill means, a movable element for entering a pin into a hole in the support, mechanism for effecting step-by-step movement of said support and operating during pauses in the movement to actuate said pin-entering element and having driving connections to actuate said drill means to drill a hole during a pause in said movement in said support at a point in advance of the point of operation of said pin-entering element, and means functioning in response to said step-by-step movement and operating upon said driving connections to halt actuation of said drill means.

16. An apparatus as claimed in claim 15 in which there is provided means for disrupting said driving connections, said halting means comprising a control means for said driving connections and a trip element movable in accordance with the step-by-step movement of said support for actuating said control means to disrupt said driving connections.

17. An apparatus for drilling holes in a support and for setting pins therein, said apparatus comprising means for movably supporting the support, movable drill means, a movable element for entering a pin into a hole in the support, mechanism for effecting step-by-step movement of said support and operating during pauses in the movement to actuate said pin-entering element and having driving connections to actuate said drill means to drill a hole during a pause in said movement in said support at a point in advance of the point of operation of said pin-entering element, means for disrupting said driving connections, and means responsive to movement of said supporting means for actuating said last-mentioned means.

18. An apparatus for drilling holes in a support and for setting pins therein, said apparatus comprising means for movably supporting the support, movable drill means, a movable element for entering a pin into a hole in the support, mechanism for effecting step-by-step movement of said support and operating during pauses in the movement to actuate said pin-entering element and having driving connections to actuate said drill means to drill a hole during a pause in said movement in said support at a point in advance of the point of operation of said pin-entering element, means including disruptible driving connections for permitting or preventing said pin-entering element to enter a pin in a hole in said support, and means for controlling said disruptible driving connections.

19. An apparatus as claimed in claim 18 in which said last-mentioned means comprises means operable in response to movement of said supporting means for actuating said controlling means.

20. An apparatus for drilling holes in a support and for setting pins therein, said apparatus comprising drill means, a movable element for entering a pin into a hole in the support, means for supporting the support and means for giving said supporting means a step-by-step traversing movement relative to said drill means and said movable element with the drill means having a space differential in advance of said movable element, mechanism for actuating said drill means to drill a hole at a pause in said step-by-step movement, mechanism for actuating said movable element to enter a pin into a hole in said support during a pause in said step-by-step movement, and means operating in timed relation to the step-by-step movement of said support for initiating pin-entering action of said movable element only after such steps in the movement of said support have taken place as correspond to said space differential.

21. An apparatus for drilling holes in a support and for setting pins therein, said apparatus comprising drill means, a movable element for entering a pin into a hole in the support, means for supporting the support and means for giving said supporting means a step-by-step traversing movement relative to said drill means and said movable element with the drill means having a space differential in advance of said movable element, mechanism for actuating said drill means to drill a hole at a pause in said step-by-step movement, mechanism for actuating said movable element to enter a pin into a hole in said support during a pause in said step-by-step movement, and means operating upon said mechanism for actuating said drill means to halt hole-drilling operation of said drill means without halting the pin-entering action of said movable element whereby the latter may continue to enter pins during ensuing pauses in said step-by-step movement and corresponding to said space differential.

22. An apparatus for drilling holes in a support and for setting pins therein, said apparatus comprising drill means, a movable element for entering a pin into a hole in the support, means for supporting the support and means for giving said supporting means a step-by-step traversing movement relative to said drill means and said movable element with the drill means having a space differential in advance of said movable element, mechanism for actuating said drill means to drill a hole at a pause in said step-by-step movement, mechanism for actuating said movable element to enter a pin into a hole in said support during a pause in said step-by-step movement, control means for said mechanisms, means operating in timed relation to the step-by-step movement of said support to actuate the control means of said second mechanism to initiate pin-entering action of said movable element only after said first mechanism has actuated said drill means to drill an initial number of holes corresponding to said space differential and for effecting said control means to halt said first mechanism to halt hole-drilling operation of said drill means without halting the pin-entering action of said movable element, whereby the latter may continue to enter pins in the remaining holes corresponding to said space differential.

23. An apparatus for drilling holes in a support and for setting pins therein, said apparatus comprising drill means, a movable element for entering a pin into a hole in the support, means for supporting the support and means for giving said supporting means a step-by-step traversing movement relative to said drill means and said movable element with the drill means having a space differential in advance of said movable element, mechanism for actuating said drill means to drill a hole at a pause in said step-by-step movement, mechanism for actuating said movable element to enter a pin into a hole in said support during a pause in said step-by-step movement, cam means movable with said supporting means and partaking of the step-by-step movement thereof, control means actuated by said cam means after said drill means has initially drilled a number of holes corresponding to said space differential for initiating pin-entering action of said movable element, and control means actuated by said cam means to halt drilling actuation by the first mechanism of said drill means at a point in the movement of said support corresponding to the last hole to be drilled by said drill means.

24. An apparatus for drilling holes in a cylindrical support and for setting pins therein, said apparatus comprising means for supporting said support, drill means, a pin-forcing element, means mounting said supporting means and said drill means and said pin-forcing element to effect relative step by step movement of translation and rotation therebetween along a helical line whereby, upon actuation thereof, said drill means and said pin-forcing element respectively drill holes in a helical row in said cylindrical support and set pins therein, manual means for selectively setting the relationship between said drill means and said pin-forcing element on the one hand and the cylindrical support carried by said supporting means on the other hand to effect hole-drilling and pin-setting along another helical line, means operable during pauses in said step by step movement to actuate said drill means to drill a hole in the cylindrical support supported by said supporting means thereby to drill a helical row of holes in said support, means operable during pauses in said step by step movement to actuate said pin-forcing element to force a pin into a drilled hole in said support, means for maintaining said pin-forcing element ineffective to force pins into drilled holes at the commencement of said step by step movement for an interval comprising as many steps in said step-by-step movement as correspond to the number of steps that said drill means is in advance of said pin-forcing element, said means for maintaining said pin-forcing element ineffective comprising controlling means therefor and means for co-relating said controlling means with the setting effected by said manual means.

25. An apparatus for drilling holes in a cylindrical support and for setting pins therein, said apparatus comprising means for supporting said support, drill means, a pin-forcing element, means mounting said supporting means and said drill means and said pin-forcing element to effect relative step by step movement of translation and rotation therebetween along a helical line whereby, upon actuation thereof, said drill means and said pin-forcing element respectively drill holes in a helical row in said cylindrical support and set pins therein, manual means for selectively setting the relationship between said drill means and said pin-forcing element on the one hand and the cylindrical support carried by said supporting means on the other hand to effect hole-drilling and pin-setting along another helical line, means operable during pauses in said step by step movement to actuate said drill means to drill a hole in the cylindrical support supported by said supporting means thereby to drill a helical row of holes in said support, means operable during pauses in said step by step movement to actuate said pin-forcing element to force a pin into a drilled hole in said support, means for halting the actuation of said drill means after it drills the last hole of a helical row whereby continued actuation of said pin-forcing element may continue to force said pins in the holes that remain in advance of said pin-forcing element, said halting means comprising control means for said drill means and means for co-relating said control means with the setting effected by said manual means.

PAUL SCHULTZE.